US012663661B2

(12) United States Patent
Gacoin

(10) Patent No.: US 12,663,661 B2
(45) Date of Patent: Jun. 23, 2026

(54) METHOD FOR MANUFACTURING A LENS ELEMENT ADAPTED FOR CORRECTING AN ABNORMAL REFRACTION OF AN EYE OF A WEARER

(71) Applicant: ESSILOR INTERNATIONAL, Charenton-le-Pont (FR)

(72) Inventor: Eric Gacoin, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 502 days.

(21) Appl. No.: 18/018,464

(22) PCT Filed: Jul. 29, 2021

(86) PCT No.: PCT/EP2021/071312
§ 371 (c)(1),
(2) Date: Jan. 27, 2023

(87) PCT Pub. No.: WO2022/023485
PCT Pub. Date: Feb. 3, 2022

(65) Prior Publication Data
US 2024/0012269 A1      Jan. 11, 2024

(30) Foreign Application Priority Data
Jul. 30, 2020      (EP) .................................... 20305880

(51) Int. Cl.
*G02C 7/02* (2006.01)
*G02B 1/04* (2006.01)

(52) U.S. Cl.
CPC ............. *G02C 7/027* (2013.01); *G02B 1/041* (2013.01); *G02C 7/022* (2013.01); *G02C 2202/08* (2013.01); *G02C 2202/24* (2013.01)

(58) Field of Classification Search
CPC .... G02C 7/027; G02C 7/022; G02C 2202/08; G02C 2202/24; G02C 2202/16;
(Continued)

(56) References Cited

U.S. PATENT DOCUMENTS 9,987,653 B2 * 6/2018 Sreenivasan ..... B29D 11/00432
11,899,287 B2 * 2/2024 Christmann ............. G02B 1/11
(Continued)

FOREIGN PATENT DOCUMENTS

CN      103476574 A      12/2013
CN      104678572 A      6/2015
(Continued)

OTHER PUBLICATIONS

International Search Report and Written Opinion dated Oct. 25, 2021 issued in International Application No. PCT/EP2021/071312 (30 pages).
(Continued)

*Primary Examiner* — William Lu
(74) *Attorney, Agent, or Firm* — NIXON & VANDERHYE

(57) ABSTRACT

Disclosed is a method for manufacturing a lens element intended to be worn in front of an eye of a person, the lens element including two opposite optical faces and a plurality of optical elements each having an optical function of not focusing an image on the retina of the eye of the person so as to slow down the progression of the abnormal refraction of the eye. The method includes: providing a lens blank having at least one unfinished face; and processing the at least one unfinished face to obtain in combination with the opposed optical face a refractive power based on the prescription for the eye of the person and at least a part of the plurality of the optical elements.

20 Claims, 3 Drawing Sheets

(58) Field of Classification Search
CPC .............. G02B 1/041; B29D 11/00009; B29D 11/00336; B29D 11/00942; B29D 11/00528; B33Y 80/00
See application file for complete search history.

(56) References Cited

U.S. PATENT DOCUMENTS

| | | | | |
|---|---|---|---|---|
| 12,174,460 | B2 * | 12/2024 | Alonso | G02C 7/022 |
| 2014/0008825 | A1 | 1/2014 | Rego et al. | |
| 2014/0320803 | A1 * | 10/2014 | Muradore | G02C 7/028 351/159.75 |
| 2016/0101573 | A1 * | 4/2016 | Quere | B29C 64/106 425/166 |
| 2016/0313572 | A1 * | 10/2016 | Haddock | G02C 7/083 |
| 2017/0146824 | A1 * | 5/2017 | Martinez | G02C 7/06 |
| 2018/0001581 | A1 * | 1/2018 | Patel | B29D 11/00961 |
| 2018/0267518 | A1 * | 9/2018 | Hassman | G05B 19/41845 |
| 2018/0275427 | A1 | 9/2018 | Lau et al. | |
| 2018/0341122 | A1 | 11/2018 | Shioya et al. | |
| 2019/0212580 | A1 * | 7/2019 | To | G02C 7/022 |
| 2020/0073147 | A1 * | 3/2020 | Bakaraju | G02C 7/022 |
| 2020/0089023 | A1 * | 3/2020 | Zhou | G02C 11/10 |
| 2021/0009849 | A1 * | 1/2021 | Tan | C09D 175/04 |
| 2021/0055573 | A1 * | 2/2021 | Back | G02C 7/042 |
| 2021/0282966 | A1 * | 9/2021 | Back | G02C 7/027 |
| 2021/0341752 | A1 * | 11/2021 | Webber | G02C 7/06 |
| 2021/0341755 | A1 * | 11/2021 | Webber | G02C 7/042 |
| 2022/0107508 | A1 * | 4/2022 | Zhou | G02C 7/06 |
| 2022/0244567 | A1 * | 8/2022 | Qi | B29D 11/00317 |
| 2022/0252902 | A1 * | 8/2022 | Nava Rudiger | G05B 19/4099 |
| 2023/0265010 | A1 * | 8/2023 | Christmann | B29D 11/00009 427/492 |

FOREIGN PATENT DOCUMENTS

| | | | | | |
|---|---|---|---|---|---|
| CN | 108474888 | A | | 8/2018 | |
| CN | 110221454 | A | | 9/2019 | |
| CN | 110226118 | A | | 9/2019 | |
| CN | 110554515 | A | | 12/2019 | |
| CN | 110 687 689 | | | 1/2020 | |
| EP | 2 878 989 | | | 6/2015 | |
| EP | 3 220 190 | | | 9/2017 | |
| EP | 3 382 430 | | | 10/2018 | |
| EP | 3561578 | A1 | | 10/2019 | |
| EP | 3 579 044 | | | 12/2019 | |
| EP | 3 640 714 | | | 4/2020 | |
| TW | I842999 | B | * | 5/2024 | A61F 2/16 |
| WO | WO-2018076057 | A1 | * | 5/2018 | G02B 27/4205 |
| WO | 2019/206569 | | | 10/2019 | |
| WO | 2020/079105 | | | 4/2020 | |
| WO | 2020/099549 | | | 5/2020 | |
| WO | WO-2020260292 | A1 | * | 12/2020 | B29D 11/00009 |
| WO | WO-2021056058 | A1 | * | 4/2021 | G02C 7/022 |
| WO | WO-2021159170 | A1 | * | 8/2021 | G02B 3/02 |
| WO | WO-2025227199 | A1 | * | 11/2025 | B29D 11/00432 |

OTHER PUBLICATIONS

Office Action and Search Report issued in Chinese Patent Application No. 202180058740.9 dated Apr. 11, 2025.
Office Action, issued in Chinese Patent Application No. 202310967999.6 dated Oct. 10, 2025.

* cited by examiner

METHOD FOR MANUFACTURING A LENS ELEMENT ADAPTED FOR CORRECTING AN ABNORMAL REFRACTION OF AN EYE OF A WEARER

This application is the U.S. national phase of International Application No. PCT/EP2021/071312 filed Jul. 29, 2021 which designated the U.S. and claims priority to EP 20305880.5 filed Jul. 30, 2020, the entire contents of each of which are hereby incorporated by reference.

FIELD OF THE DISCLOSURE

The disclosure relates to a method for manufacturing a lens element adapted for correcting an abnormal refraction of an eye of a wearer, and comprising a plurality of optical elements placed on a surface of the lens element so as to prevent or slow down a progression of the abnormal refraction of the eye.

BACKGROUND OF THE DISCLOSURE

Myopia of an eye is characterized by the fact that the eye focuses distant objects in front of its retina, hypermetropia is characterized by the fact that the eye focuses distant objects behind of its retina. Myopia is usually corrected using a concave lens providing negative dioptric power and hypermetropia is usually corrected using a convex lens providing positive dioptric power.

It has been observed that some individuals when corrected using conventional single vision optical lenses, in particular children, focus inaccurately when they observe an object which is situated at a short distance away, that is to say, in near vision conditions. Because of this focusing defect on the part of a myopic child which is corrected for his far vision, the image of an object close by is also formed behind his retina, even in the foveal area.

Such focusing defect may have an impact on the progression of myopia of such individuals. One may observe that for most of said individual the myopia defect tends to increase over time partly caused by long and intensive near work sessions.

In particular, studies carried out on monkeys have shown that strong defocusing of the light behind the retina, which occurs away from the foveal zone, may cause the eye to extend and therefore may cause a myopia defect to increase.

Recent improvements in the field of ophthalmic lenses, have allowed developing optical lenses comprising optical elements to prevent, or at least slow down, the progression of abnormal refractions of an eye such as myopia or hyperopia.

Although the use of optical lenses comprising optical elements that do not focus an image on the retina has shown to present good results in preventing and slowing down the progression of an abnormal refraction of an eye, the utilization of such lenses may have some drawback.

Indeed, the optical elements may generate a multiplicity of blur images that may superpose on the retina with the sharp image generated by the ophthalmic lens. Such superposition of sharp and blur images may reduce the optical performances of the wearer, and/or its comfort. For example, a high density of optical elements may induce a loss of contrast sensitivity, and distortions that could lead to headaches. On the contrary, a small density of optical elements may have a really small impact on the prevention/slowing down of the abnormal refraction progression.

Therefore, methods for customizing the optical elements to the needs of the wearer have been developed, for example in WO 2020/099549. The manufacturing of ophthalmic lenses providing simultaneously the refractive power corresponding to the prescription of the wearer and having customized optical elements is complex.

Currently ophthalmic lenses having optical elements for slow down the progression of the abnormal refraction of the eye, such as micro lenses, are manufactured using a lens mold. The lens mold comprises the optical elements that are obtained on the surface of the mold using a diamond cutting tool. A semi-finished optical lens is obtained by injecting an optical material in the mold. The refraction power corresponding to the prescription of the wearer is obtained by determining the geometry of the unfinished surface that is machined so as to provide such refractive power.

Existing manufacturing methods have some drawbacks. In particular, optical molds are expansive to provide. Therefore, the use of mold to provide the optical element is not easily compatible with having customized optical elements. Furthermore, a change of optical design of the optical elements is costly to implement as it requires changing the optical molds.

Therefore, there is a need for a method of manufacturing an ophthalmic lens adapted for correcting an abnormal refraction of an eye of a wearer that overcomes the above mentioned drawbacks. A goal of the present disclosure is to provide such method.

SUMMARY OF THE DISCLOSURE

To this end, the disclosure proposes a method for manufacturing a lens element intended to be worn in front of an eye of a person, the lens element comprising two opposite optical faces and a plurality of optical elements each having an optical function of not focusing an image on the retina of the eye of the person so as to slow down the progression of the abnormal refraction of the eye, the method comprises:

providing a lens blank having at least one unfinished face,
  processing at least a part of the plurality of the optical elements and the at least one unfinished face to obtain in combination with the opposed optical face a refractive power based on the prescription for said eye of the person.

Advantageously, processing the unfinished face to obtain in combination with the opposed optical face a refractive power based on the prescription for said eye of the person and at least a part of the plurality of the optical elements allows a greater flexibility in the optical design or optical function of the optical elements.

Therefore, the optical elements may be customized for the wearer.

According to further embodiments which can be considered alone or in combination:

the optical function refers to light refraction; and/or
  the processing of the at least one unfinished face comprises surfacing and/or 3D printing and/or inkjet and/or film or patch positioning; and/or
  following the processing, the at least a part of the optical elements in combination with the processed unfinished face provide to the wearer a refraction power according to the wearer's prescription; and/or
  the processing is made by a single-pass; and/or
  the perimeter of the patch is identical to the perimeter of the lens onto which the patch must be positioned; and/or the at least part of the plurality of optical elements are contiguous; and/or the at least part of the plurality of optical elements are concave and/or convex;

the optical element has an aspherical surface without a rotational axis of symmetry;

the at least one unfinished face is the front or back face of the lens blank; and/or least one, for example all, of the optical element has an optical function of focusing an image on a position other than the retina in standard wearing conditions or of not focusing an image in standard wearing conditions; and/or at least one, for example all, of the optical element has a non-spherical optical function in standard wearing conditions; and/or at least one, for example all, of the optical element has a spherical optical function in standard wearing conditions; and/or the method further comprises prior to the processing:

providing prescription data adapted at least for correcting the abnormal refraction of the eye of the person;

providing at least one abnormal refraction parameter relating to the abnormal refraction of an eye of the person;

providing at least one sensitivity parameter representing the variation of sensitivity of the person as a function of at least one parameter of the optical elements;

determining a value of the at least one parameter of the optical elements adapted for the person based on the abnormal refraction parameter and the sensitivity parameter;

determining surface data representing at least one surface of a lens element to be manufactured based at least on the prescription data and the value of the at least one parameter of the optical elements adapted for the person; and/or the surface data comprises power map and/or xyz optical element location; and/or the at least one abnormal refraction parameter corresponds to a lag of accommodation of the person; and/or the at least one optical element parameter corresponds to the density of optical elements over the surface of the lens element; and/or the processing of the at least one unfinished face and at least a part of the plurality of the optical elements are realized in one pass; and/or the processing of the at least one unfinished face and at least a part of the plurality of the optical elements are realized successively, by processing the at least one unfinished face then by processing the at least a part of the plurality of the optical elements; and/or the processing of the at least one unfinished face and at least a part of the plurality of the optical elements are realized in the same frame of reference without unblocking the lens blank, for example by using different tools; and/or the provided lens blank the at least one unfinished surface comprises a layer of PMMA disposed on the at least one unfinished surface, for example a layer having a thickness greater than 0.2 mm and smaller than 20 mm; and/or after surfacing the method comprises polishing the machined surface comprises at least part of the plurality of the optical elements wherein the polishing tool and/or polishing speed and/or polishing time is adapted to reduce material removal while maintaining a high level of transparency; and/or the method further comprises determining a sensitivity value based on the value of the at least one parameter of the optical elements adapted for the wearer and the at least one sensitivity parameter; and/or the method further comprises comparing the sensitivity value and the threshold value; and/or the method further comprises determining a most appropriate value of the at least one parameter of the optical elements, the most appropriate value of the at least one parameter of the optical elements being the determined value of the at least one parameter of the optical elements when the sensitivity value is lower than the threshold value, and being the value associated with a sensitivity value equal to the threshold value when the sensitivity value is higher than or equal to the threshold value; and/or the ophthalmic lens is determined based on the prescription data and the most appropriate value of the at least one parameter of the optical elements adapted for the wearer; and/or the abnormal refraction of the eye corresponds to myopia; and/or the abnormal refraction of the eye corresponds to hypermetropia; and/or the at least one abnormal refraction parameter corresponds to a progression per year of the abnormal refraction of the eye of the wearer; and/or the at least one abnormal refraction parameter corresponds to a lag of accommodation of the wearer; and/or the at least one parameter of the optical elements corresponds to the number of optical elements on the surface of the ophthalmic lens; and/or the at least one optical element parameter corresponds to the density of optical elements over the surface of the ophthalmic lens; and/or the at least one optical element parameter corresponds to the position of the optical elements on the surface of the ophthalmic lens; and/or the at least one optical element parameter corresponds to the spacing between the optical elements over the surface of the ophthalmic lens; and/or the at least one optical element parameter corresponds to the size of the optical elements over the surface of the ophthalmic lens; and/or the at least one optical element parameter corresponds to the curvature of the surface of at least a plurality of three optical elements of the ophthalmic lens; and/or the at least one optical element parameter corresponds to the optical power of at least a plurality of three optical elements of the ophthalmic lens in standard wearing conditions; and/or the at least one sensitivity parameter corresponds to visual acuity; and/or the at least one sensitivity parameter corresponds to a contrast sensitivity; and/or the at least one sensitivity parameter corresponds to a level of comfort of the wearer while wearing the ophthalmic lens; and/or the method further comprises providing a viewing angle parameter relating to a specific viewing angle; and/or the method further comprises providing a viewing distance parameter relating to a specific viewing distance; and/or the at least one sensitivity parameter represents the variation of sensitivity of the wearer for the at least one viewing angle and at least one viewing distance, as a function of at least one parameter of the optical elements.

The disclosure also relates to a lens element, for example obtain by a method according to the disclosure, intended to be worn in front of an eye of a person and comprising two opposite optical faces and a plurality of optical elements having an optical function of not focusing an image on the retina of the eye of the person so as to slow down the progression of the abnormal refraction of the eye, wherein at least a part of the plurality of the optical elements are disposed on one of the optical face that in in combination with the opposed optical face provides a refractive power based on a prescription for said eye of the person.

The lens element according to the disclosure may further comprise a layer of PMMA on at least one surface comprising at least part of the plurality of optical elements.

The lens element further comprises a prescription portion configured to provide to the wearer, in standard wearing conditions, a correction optical function based on the prescription of the wearer for correcting an abnormal refraction of said eye of the wearer.

The prescription can be a set of optical characteristics of optical power, of astigmatism, of prismatic deviation, of axis determined by an ophthalmologist or optometrist in order to correct vision defects of the wearer.

The disclosure finally relates to a mold for a lens element, for example according to the disclosure, intended to be worn in front of an eye of a person, comprising two opposite optical faces and a plurality of optical elements having an optical function of not focusing an image on the retina of the eye of the person so as to slow down the progression of the abnormal refraction of the eye, said mold comprising:

a first molding element having a first surface, the first surface having a first surfacic curvature and comprising a plurality of surfacic elements having at least a second surfacic curvature that differs from the first, a second molding element having a second surface, a gasket having an inner and an outer surfaces, wherein the first and second surface are configured to as to provide to the lens element a refractive power based on the prescription for said eye of the person, and the first molding element, the second element and the inner surface of the gasket form a molding cavity in which a molding material is to be filled.

BRIEF DESCRIPTION OF THE DRAWINGS

Embodiments of the disclosure will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help to improve the understanding of the embodiments of the present disclosure.

DETAILED DESCRIPTION OF EMBODIMENTS OF THE DISCLOSURE

The disclosure relates to a method for manufacturing a lens element adapted for a person and intended to be worn in front of an eye of said person. Moreover, the lens element is intended to be worn in front of an eye of a person to provide eyesight correction and prevent or at least slow down a progression of abnormal refractions of the eye such as for example myopia, hyperopia or astigmatism.

In the description, terms like «up», «bottom», «horizontal», «vertical», «above», «below», «front», «rear» or other words indicating relative position may be used. These terms are to be understood in the wearing conditions of the lens element.

In the context of the present disclosure, the term "lens element" can refer to an uncut optical lens or a spectacle optical lens edged to fit a specific spectacle frame or a contact lens or an ophthalmic lens and an optical device adapted to be positioned on the ophthalmic lens. The optical device may be positioned on the front or back surface of the ophthalmic lens. The optical device may be an optical patch. The optical device may be adapted to be removably positioned on the ophthalmic lens for example a clip configured to be clipped on a spectacle frame comprising the ophthalmic lens.

The disclosure further relates to a lens element, for example obtain by a method according to the disclosure and intended to be worn in front of an eye of a person.

Figure 1:
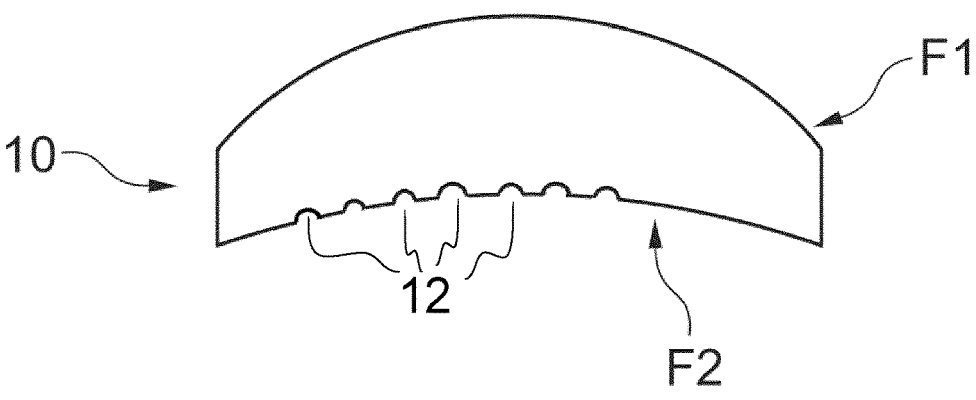
FIG. 1 illustrates a plan view of a lens blank provided in a method according to an embodiment of the disclosure.

As represented on FIG. 1, a lens element 10 according to one embodiment of the present disclosure comprises two opposite optical faces F1 and F2 and a plurality of optical elements 12 each having an optical function of not focusing an image on the retina of the eye of the person so as to slow down the progression of the abnormal refraction of the eye.

A lens element 10 according to the disclosure as represented on FIG. 1, comprises an object side surface F1 formed as a convex curved surface on FIG. 1 toward an object side, and an eye side surface F2 formed as a concave surface on FIG. 1 having a different curvature than the curvature of the object side surface F1.

According to an embodiment of the disclosure, at least part, for example all, of the optical elements are located on the front surface of the lens element.

At least part, for example all, of the optical elements may be located on the back surface of the lens element.

According to an embodiment of the invention the lens element comprises in addition to the plurality of optical elements a refraction area having a refractive power based on a prescription for the wearer.

According to an embodiment of the invention, the at least part of the plurality of optical elements may be concave and/or convex.

The refraction area is preferably formed by the area not covered by any optical element of the plurality of optical elements 12. In other words, the refractive area is the complementary area to the areas formed by the plurality of optical elements 12.

Each of the optical elements has an optical function of not focusing an image on the retina of the eye of the wearer.

When the abnormal refraction of the eye of the person corresponds to myopia the optical elements 12 have an optical function of focusing an image in front of the retina of the eye of the wearer when worn by the wearer.

When the abnormal refraction of the eye of the person corresponds to hypermetropia the optical elements 12 have an optical function of focusing an image behind the retina of the eye of the wearer when worn by the wearer.

In the sense of the invention "focusing" is to be understood as producing a focusing spot with a circular section that can be reduced to a point in the focal plane.

Advantageously, such optical function of the optical element produces an optical signal that inhibits the deformation of the retina of the eye of the wearer, allowing to prevent or at least slow down the progression of the abnormal refraction of the eye of the person wearing the lens element.

According to an embodiment of the invention at least part of the plurality of optical elements are contiguous.

Optical elements are considered contiguous if over a pupil having at least a 4 mm diameter, the lens element produces a first optical path difference OPD1, a best spherical fitting lens element produces a second optical path difference OPD2, a differential optical path map DOP being composed as the difference between said first optical path difference OPD1 and said second optical path difference OPD2, and the portion of said differential optical path DOP within the range [minimum level of DOP, minimum level of DOP+10% of the amplitude] represents less than 30% of said differential optical path (DOP) over said pupil, for example at least 20%, for example at least 10%, for example at least 5%; with the amplitude the maximum level of said differential optical path (DOP) over said pupil.

According to an embodiment, two optical elements located on a surface of the lens element are contiguous if there is a path supported by said surface that links the two optical elements and if along said path one does not reach the basis surface on which the optical elements are located.

When the surface on which the at least two optical elements are located is spherical, the basis surface corresponds to said spherical surface. In other words, two optical elements located on a spherical surface are contiguous if there is a path supported by said spherical surface and linking them and if along said path one may not reach the spherical surface.

When the surface on which the at least two optical elements are located is non-spherical, the basis surface corresponds to the local spherical surface that best fit said non-spherical surface. In other words, two optical elements located on a non-spherical surface are contiguous if there is a path supported by said non-spherical surface and linking them and if along said path one may not reach the spherical surface that best fit the non-spherical surface. In other words, in a sectional view, the path between the two optical elements is not tangential to the spherical surface that best fit the non-spherical surface.

In terms of optical power, it results that the surfacic power of the path is different from surfacic power of the spherical surface that best fit the non-spherical surface.

According to another embodiment, optical elements being contiguous can also be defined in a surfacic manner.

A measured surface being between 3 mm$^2$ and 10 mm$^2$ is considered. The measured surface being fully covered by optical elements. The measured surface comprises a density between 0.05 optical element per mm$^2$ and 125 optical elements per mm$^2$, for example between 0.25 optical element per mm$^2$ and 5 optical elements per mm$^2$ or between 0.75 optical element per mm$^2$ and 2 optical elements per mm$^2$ or between 1 optical elements per mm$^2$ and 4 optical elements per mm$^2$ or between 5 optical elements per mm$^2$ and 75 optical elements per mm$^2$ or between 50 optical elements per mm$^2$ and 500 optical elements per mm$^2$. If in said measured surface, at least 95% of the surface, preferably 98%, has an optical power different from the surface onto which the optical elements are located, said optical elements are considered to be contiguous.

In an embodiment, the measured surface may be fully covered by optical elements.

According to an embodiment, at least one, for example all, of the optical element has an optical function of focusing an image on a position other than the retina in standard wearing conditions or of not focusing an image in standard wearing conditions.

According to a further embodiment, at least one, for example all, of the optical element has a non-spherical optical function in standard wearing conditions.

Alternatively, at least one, for example all, of the optical element has a spherical optical function in standard wearing conditions.

Although not represented on FIG. 1, the lens element according to an embodiment of the disclosure may further comprising a layer of Poly(methyl methacrylate), i.e. PMMA, on at least one surface comprising at least part of the plurality of optical elements.

Figure 2:
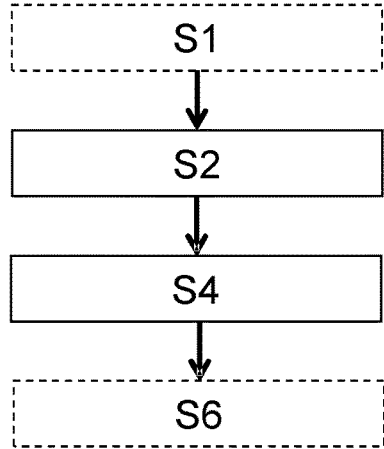
FIG. 2 is a chart-flow representative of a method according to an embodiment of the disclosure.

As illustrated on FIG. 2, the method of manufacturing a lens element according to the disclosure comprises at least the steps of:

S2 providing a lens blank,

S4 processing said lens blank.

Figure 3:
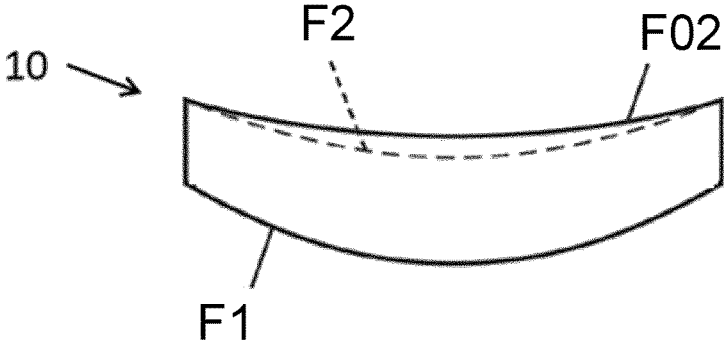
FIG. 3 illustrates a plan view of a lens element obtained with a method according to an embodiment of the disclosure.

As represented on FIG. 3, the lens blank provided has at least one unfinished face. Typically, the lens blank has an unfinished face and a finished face, the finished face may be spherical or aspherical.

The unfinished face is a face which, in combination with the finished face, is not adapted to the prescription of the wearer. The lens blank which comprises an unfinished face is different from a lens element adapted to the prescription of the wearer, onto which at least one optical element is mounted, fixed or formed.

In the sense of the invention an "aspherical surface" is to be understood as a non-spherical surface without a rotational axis of symmetry.

As represented on FIG. 3, a lens blank has a first optical face F1 and a second optical face F02. The first and second optical faces are connected by an external periphery surface.

Typically, the first optical face F1 has a finished face associated with a first reference system. The second optical face F02 has an unfinished face to be machined so as to provide in combination with the finished opposed optical face a refractive power based on the prescription for the eye of the wearer and a plurality of the optical element. Each optical element having an optical function of not focusing an image on the retina of the eye of the person so as to slow down the progression of the abnormal refraction of the eye The lens blank provided during the method of the disclosure may be obtained by molding, casting or machining or additive manufacturing.

According to an embodiment of the disclosure, the at least one unfinished surface of the lens blank may comprise a layer of Poly(methyl methacrylate) or PMMA. For example the unfinished surface of the lens blank is covered with a layer of PMMA, for example a layer having a thickness greater than 0.2 mm and smaller than 20 mm.

Advantageously, the PMMA layer can be surfaced and the finished surface is of great quality and requires nor or very little polishing. Reducing the polishing step is of great interest when the manufactured surface comprises optical elements for having an optical function of not focusing an image on the retina of the eye of the person, such as micro-lenses, since the optical function of such optical elements may be greatly affected by the polishing.

Once the lens blank is provided, the method of the disclosure further comprises processing the at least one unfinished face to obtain in combination with the opposed optical face a refractive power based on the prescription for said eye of the person and at least a part of the plurality of the optical elements.

The term "prescription" is to be understood to mean a set of optical characteristics of optical power, of astigmatism, of prismatic deviation, determined by an ophthalmologist or optometrist in order to correct the vision defects of the eye, for example, by means of a lens positioned in front of his eye. For example, the prescription for a myopic eye comprises the values of optical power and of astigmatism with an axis for the distance vision.

The processing of the at least one unfinished face comprises surfacing and/or 3D printing and/or inkjet and/or film or patch positioning or any combination of said methods. By "surfacing", we mean shaping the surface by material removal, such as digital surfacing. The surfacing is usually realized with a tool able to shape the surface by material removal such as for example a diamond tool.

The processing may be maybe carried in a single-pass. In other words, the processing comprises a single surfacing or a single operation During the processing step S2, both aspects of the optical function, i.e. providing the refractive power and the optical elements may be realized simultaneously, for example, by processing alternatively a part of the plurality of the at least one unfinished face and a part of the at least a part of the plurality of the optical elements in order to provide finally the refractive power and the optical elements. In other words, by processing concomitantly a part of the plurality of the at least one unfinished face and a part of the at least a part of the plurality of the optical elements in order to provide finally the refractive power and the optical elements.

Advantageously, the reference frame of reference of both aspects of the optical function is the same, increasing the accuracy of the overall optical function.

However, for manufacturing reasons the processing of the at least one unfinished face and at least a part of the plurality of the optical elements may be realized successively, in two passes, by processing the at least one unfinished face then by processing the at least a part of the plurality of the optical elements. For example, if a different manufacturing method is to be used for providing the refractive power than for providing the optical elements.

Preferably, even when the processing of the at least one unfinished face and at least a part of the plurality of the optical elements may be realized successively each processing is realized in the same frame of reference, in particular without unblocking the lens blank, for example by using different machining tools.

As illustrated on FIG. 2, the method according to the invention may further comprise prior to processing the unfinished surface, calculating the surface to be processed. The surface to be processed may be described in different ways.

For example, the processing device may be provided with a xyz point cloud, describing surface of the face to be manufactured. Such file may result from external calculation. According to a further embodiment, the processing device may receive parametric description of the surface to be manufactured. For example, when the finished surface comprises a spherical holder and optical elements, the parametric description may comprise the radius of the holder and separate information concerning the optical elements such as their xy position, radius, diameter . . . . The cutting machine (software of the cutting machine or machining process of the cutting machine) should then know the rules to assemble both.

According to an embodiment, the position of the optical element may be optimized to simplify or speed-up the processing of the unfinished face. For example, the optical elements may be limited to the smallest possible diameter inside frame so as to seed-up the processing step.

The calculation of the surface of the finished surface may be taken into account the effect of the processing of the surface. In other words, the processing of the lens may have an effect on the surface that is to be compensated. WO 2020/079105 describes an example of compensation of the coating to the finished optical lens.

For example, the polishing of the finished surface and/or the coating of the finished surface may affect the optical function of the optical elements. Such effect of the optical function may be compensated for when calculating the surface to be processed. The processing of the unfinished surface is described hereafter with reference to surfacing such unfinished surface, however the present disclosure is not limited to such processing and other processing method may be used.

The processing of the unfinished surface may comprise the steps of:

blocking the lens blank, surfacing the unfinished face of the lens blank, polishing the finished surface According to an embodiment taken alone or in combination, the method may comprise further a step of adding marks or engraving as positioning references.

The blocking of the lens blank is done using any known blocking methods. In particular, the lens blank is blocked on the finished face to as to have the unfinished face free for surfacing.

The position of the blocked lens blank is known in a reference frame. In particular the position and orientation of the unfinished surface is known in a reference frame.

The unfinished surface of the lens blank is surfaced so as to provide in combination with the opposed optical face a refractive power based on the prescription for the eye of the person and at least a part of the plurality of the optical elements.

The surfacing may be done with a diamond tool, set on a fast tool servo which drives accurately the tool trajectory. Along a cutting spire, the diamond tool may rise and plunge depending on the design of surface to be obtained.

As indicated previously, the part of the unfinished face corresponding to providing the refractive power and at least a part of the plurality of the optical elements are realized simultaneously. In other words, the surfacing of the surface can be done in a single pass, for example, by processing alternatively a part of the plurality of the at least one unfinished face and a part of the at least a part of the plurality of the optical elements in order to provide finally the refractive power and the optical elements.

Advantageously, both parts of the surface, the one contributing to the refractive power and the optical elements being processed simultaneously, the relative position is accurate, and the processing time is reduced.

In some cases, the machining tool used to obtain the main surface, i.e. the surface that in combination with the opposed surface provides the refractive power corresponding to the prescription of the user, and the tool used to obtain the optical elements are different. For example, the optical elements may be obtained using a milling spindle whereas the main surface is obtained using a diamond turning tool.

Therefore, the surfacing is to be done in at least two different passes. To assure the accurate positioning of the optical elements preferably, the lens blank remains blocked on the same chuck during the different passes of the surfacing.

As illustrated on FIG. 2, the method of the invention may comprise after the surfacing a step of polishing the finished surface to make said surface more transparent and non-diffusing.

Although, the polishing is a usual processing step in the manufacturing of optical lenses, said polishing may need to be adapted due to the presence of optical elements on the finished surface. Indeed, the optical elements are usually of only a few μm or a few mm, therefore, the polishing may affect the optical function of said optical element.

Thus, the polishing tool and/or polishing speed and/or polishing time is adapted to reduce material removal while maintaining a high level of transparency.

Typically, a standard polishing comprises a polishing pad mounted on a polishing foam. The inventors have observed that using a polishing tool on which the polishing pad has been removed so that only the foam is rubbing the finished surface of the lens provides a good compromise between the transparency and the effect on the optical function of the optical elements.

As indicated previously, surfacing a layer of PPMA on the lens blank to obtain the finished surface has the advantage of providing a finished surface that does not require polishing.

The effect of the polishing, in particular on the optical elements can be compensated during the calculation of the finished surface.

The method of the disclosure may further comprise after the polishing of the finished surface a step of coating of the finished surface.

Figure 4:
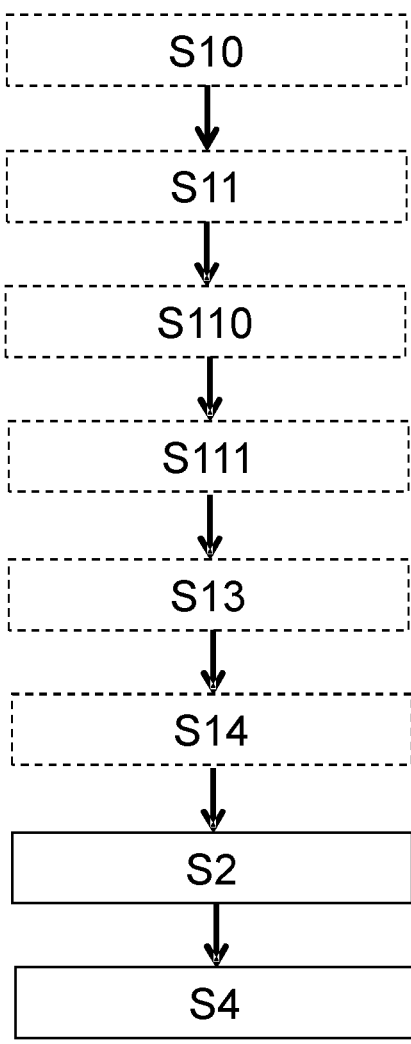
FIG. 4 is a chart-flow representative of a method according to an embodiment of the disclosure.

As illustrated on FIG. 4, the method according to the disclosure may comprise prior to the step S2 of processing a step S10 of providing prescription data. The prescription data are adapted at least for correcting the abnormal refraction of the eye of the wearer. The method may further comprise a step S11 of providing at least one abnormal refraction parameter. The abnormal refraction parameter relates to the abnormal refraction of the eye of the wearer.

According to an embodiment, the abnormal refraction parameter may relate to a progression of the abnormal refraction over time. For example, the abnormal refraction parameter may be the evolution over a year, or over years of the abnormal refraction of the eye of the wearer.

The progression of the abnormal refraction may be determined by measuring the evolution of the prescription to correct the abnormal refraction of the eye of the wearer. Such parameter may also be characterized by a ratio of myopia evolution between a first initial measure of the abnormal refraction of the eye of the wearer and a second measure of said abnormal refraction.

According to another embodiment of the invention, the abnormal refraction parameter may relate to a lag of accommodation of the wearer. The lag of accommodation corresponds to the dioptric value in which the accommodative stimulus exceeds the accommodative response.

Lag of accommodation occurs when an eye shifts its regard from a far target to a target between the far one and the eye. In such situation the retinal conjugate point is beyond the nearer target regardless of the eye's effort to maintain distinct vision. In other words, instead of focusing right on the plane of the object, the eye actually focuses on a point behind it.

Figure 5:
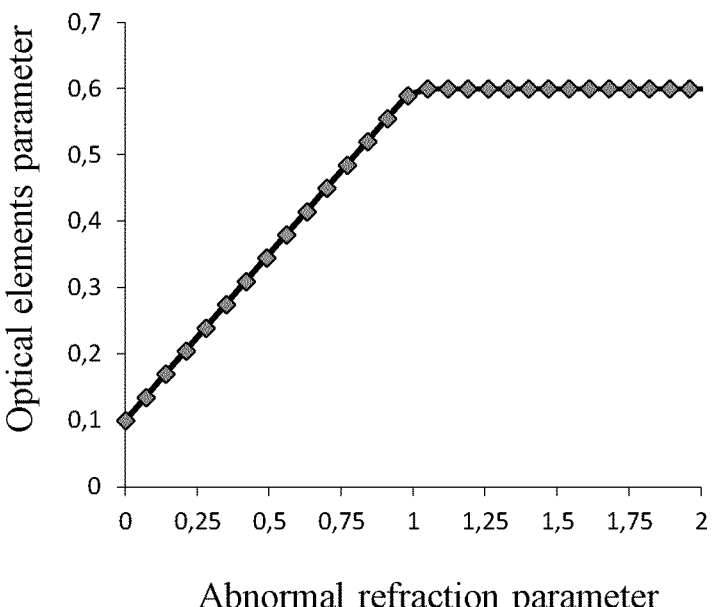
FIG. 5 illustrates a relation law between an abnormal refraction parameter and a parameter of the optical elements.

As illustrated on FIG. 5, the progression of the abnormal refraction of an eye of a wearer may be expressed as a function of at least one parameter of the optical elements. Such function corresponds to a predefined law (L) that associates a value of progression of the abnormal refraction of an eye with a value of an optical parameter that is appropriate to prevent or slow-down said abnormal refraction. In other words, the law provides the required value of a parameter of the optical elements to best prevent or slow down the abnormal refraction of the eye.

The method according to the disclosure may further comprise a step of providing a viewing distance parameter. The viewing distance parameter corresponds to a specific viewing distance. For example, the viewing distance may relate to far vision or near vision.

In the sense of the invention, the viewing distance corresponds to the distance between an eye of the wearer wearing an ophthalmic lens and the object seen by said wearer.

The method for determining an ophthalmic lens according to the invention may further comprise a step of providing a viewing angle parameter. The viewing angle parameter corresponds to a specific viewing angle of the wearer.

In the sense of the invention, the viewing angle corresponds to the angle between the direction between the eye of the wearer and the object seen by said wearer wearing an ophthalmic lens, and a horizontal direction passing through the geometrical center of the lens and the geometrical center of the eye of the wearer.

The method according to the disclosure may further comprises a step S12 of providing at least one sensitivity parameter. The sensitivity parameter represents the variation of a sensitivity of the wearer as a function of at least one parameter of the optical elements.

Figure 6:
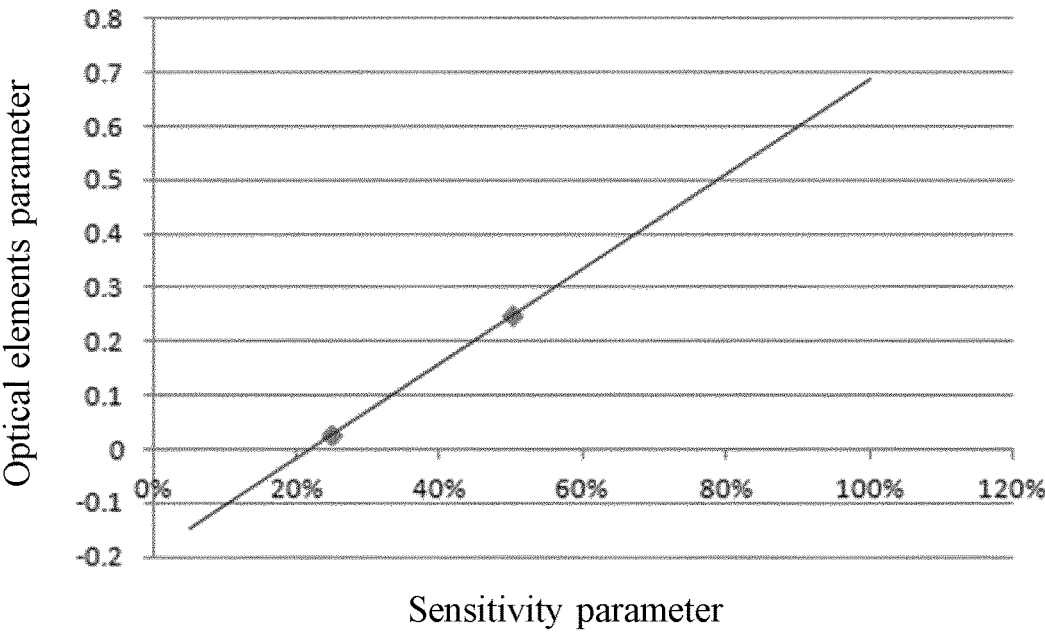
FIG. 6 illustrates a relation law between a parameter of the optical elements and a sensitivity parameter.

As illustrated on FIG. 6, the sensitivity parameter may be expressed as a function of at least one parameter of the optical elements.

The parameter of the optical elements impacts the sensitivity of the wearer wearing the ophthalmic lens. For example, a high density of optical elements placed on a surface of the ophthalmic lens may have a more important impact on the sensitivity of the wearer than a low density of optical elements.

Such sensitivity parameter may be determined for example, by measuring the perceived sensitivity of the wearer using ophthalmic lenses with different values of a parameter of the optical elements. For example, multiple ophthalmic lenses with increasing values of the optical elements density may be presented to a wearer that is asked to express his perceived sensitivity while wearing said lenses.

According to an embodiment, the sensitivity parameter may represent the variation of sensitivity of the wearer for specific provided viewing distance and viewing angle as a function of at least one parameter of the optical elements.

According to an embodiment, the at least one sensitivity parameter may relate to a visual acuity of the wearer, and more particularly to a drop of visual acuity of the wearer. The visual acuity of the wearer is a measure of the spatial resolution of the visual processing system of said wearer. The visual acuity commonly refers to the clarity of vision.

Commonly, the visual acuity is measured using a Snellen chart consisting of horizontal lines of letters whose size decreases with each successive line.

According to another embodiment, the at least one sensitivity parameter may relate to a contrast sensitivity, and more particularly to a loss of contrast sensitivity. The contrast sensitivity relates to the ability of a person to discern the difference in brightness of adjacent areas.

Commonly, the contrast sensitivity is measured using a Pelli Robson chart consisting of horizontal lines of letters whose contrast decreases with each successive line.

According to another embodiment, the at least one sensitivity parameter may relate to a level of comfort of the wearer. The level of comfort of a wearer represents its perceived quality of comfort while looking through an ophthalmic lens.

The method for determining an ophthalmic lens according to the invention further comprises a step S13 of determining a value of the at least one parameter of the optical elements. The value of the parameter of the optical elements is adapted for the wearer. The value of the parameter of the optical elements is determined based on the abnormal refraction parameter. As represented on FIG. 4, the variation of the abnormal refraction parameter may be expressed as a function of at least one parameter of the optical elements. By reporting the value of the abnormal refraction parameter provided during step S13 of the method of the disclosure on the predefined law (L) representing the variation of an optical element parameter as a function of the abnormal refraction parameter, a value of a parameter of the optical elements that is appropriate to prevent or slow-down said abnormal refraction is obtained.

The method according to the disclosure may further comprises a step S110 of obtaining a threshold value. The threshold value represents a limit value of sensitivity over which the vision comfort or vision performance of a person becomes unacceptable.

The threshold value may be a predetermined value. Alternatively the threshold value may be specific to the wearer.

The method according to the disclosure may further comprises a step S111 of determining sensitivity value based on the value of the at least one parameter of the optical elements adapted for the wearer and the at least one sensitivity parameter.

The sensitivity parameter provided during step S12 represents the variation of the sensitivity of the wearer as a function of at least one parameter of the optical elements. By reporting the determined value of the optical elements on the function of the sensitivity parameter of the wearer, the value of the sensitivity parameter of the wearer for an ophthalmic lens comprising such optical elements may be determined.

The method according to the invention may further comprises a step S14 of comparing the sensitivity value determined in step S111 and the threshold value obtained in step S110.

The method according to the disclosure may further comprises a step S131 of determining a most appropriate value of the at least one parameter of the optical elements. The most appropriate value of the at least one parameter of the optical elements should be understood as the value of the parameter which is best adapted for the wearer. In other words, the most appropriate value corresponds to the at least one parameter of the optical elements that provides the best slowing-down and/or reduction and/or prevention of the progression of the abnormal refraction of the eye of the wearer without affecting the vision experience quality of the person.

When the determined value of the sensitivity parameter is lower than the threshold value, the previously determined value of the parameter of the optical elements is the most appropriate value of the at least one parameter of the optical elements. Otherwise, when the determined value of the sensitivity parameter is higher than, or equal to the threshold value, the most appropriate value of the at least one parameter of the optical elements is the value associated with a sensitivity value equal to the threshold value.

The method according to the disclosure may further comprises a step S14 of determining an ophthalmic lens based at least on the prescription data and the most appropriate value of the at least one parameter of the optical elements adapted for the wearer.

The lens element further comprises a prescription portion configured to provide to the wearer, in standard wearing conditions, a correction optical function based on the prescription of the wearer for correcting an abnormal refraction of said eye of the wearer.

The prescription can be a set of optical characteristics of optical power, of astigmatism, of prismatic deviation, of axis determined by an ophthalmologist or optometrist in order to correct vision defects of the wearer.

Advantageously, such a method allows determining a parameter of the optical elements of the ophthalmic lens that provide the best possible prevention or slowing down of the abnormal refraction without overly reducing the visual comfort or performance of the wearer.

According to an embodiment, the parameter of the optical elements corresponds to the number of optical elements placed on the surface of the ophthalmic lens.

According to another embodiment, the parameter of the optical elements corresponds to the density of optical elements placed on the surface of the ophthalmic lens.

The parameter of the optical elements may also correspond to the position of the optical elements on the surface of the ophthalmic lens.

According to another embodiment, the parameter of the optical elements corresponds to the spacing between the optical elements. The spacing between the optical elements relates to the distance between the external limit of the surface each adjacent optical elements. The optical elements have a contour shape that is inscribable in a circle, and said circle represents the surface of said optical element.

The parameter of the optical elements may further correspond to the size of the optical elements placed on the surface of the ophthalmic lens. In the sense of the invention, the size of the optical elements refers to the size of the surface of said optical elements. The parameter of the optical elements may further correspond to the surface curvature of the optical elements.

According to another embodiment, the parameter of the optical elements corresponds to the optical power of the optical elements of the ophthalmic lens in specific wearing conditions. The specific wearing conditions preferably relates to standard wearing conditions, however the specific wearing condition may be personalized wearing conditions that are measured on the wearer when the wearer wears a spectacle frame he/she chose.

The wearing conditions are to be understood as the position of the lens element with relation to the eye of a wearer, for example defined by a pantoscopic angle, a Cornea to lens distance, a Pupil-cornea distance, a center of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens; for example equal to 12 mm.

The Pupil-cornea distance is the distance along the visual axis of the eye between its pupil and cornea; usually equal to 2 mm.

The CRE to pupil distance is the distance along the visual axis of the eye between its center of rotation (CRE) and cornea; for example equal to 11.5 mm.

The CRE to lens distance is the distance along the visual axis of the eye in the primary position (usually taken to be the horizontal) between the CRE of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to 8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of standard wearer condition may be defined by a pantoscopic angle of 8°, a Cornea to lens distance of 12 mm, a Pupil-cornea distance of 2 mm, a CRE to pupil distance of 11.5 mm, a CRE to lens distance of 25.5 mm and a wrap angle of 0°. The disclosure has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the disclosure, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:

1. A method for manufacturing a lens element configured to be worn in front of an eye of a person, the lens element including two opposite optical faces and a plurality of optical elements each having an optical function of not focusing an image on the retina of the eye of the person to slow down the progression of the abnormal refraction of the eye, the method comprising:

providing a lens blank having at least one unfinished face;

processing at least a part of the plurality of the optical elements having the optical function and the at least one unfinished face to obtain in combination with the opposed optical face a refractive power based on the prescription for said eye of the person, wherein the optical function is light refraction, and wherein a part of the at least one unfinished face that provides the refractive power and at least the part of the plurality of the optical elements are realized in a same manufacturing operation.

2. The method according to claim 1, wherein the processing of the at least one unfinished face comprises one or more of surfacing, 3D printing, inkjet, and film or patch positioning.

3. The method according to claim 1, wherein the at least part of the plurality of optical elements are contiguous.

4. The method according to claim 1, wherein the at least one unfinished face is the front or back face of the lens blank.

5. The method according to claim 1, wherein at least one of the optical elements has an optical function of focusing an image on a position other than the retina in standard wearing conditions or of not focusing an image in standard wearing conditions.

6. The method according to claim 1, wherein at least one of the optical elements has an aspherical surface without a rotational axis of symmetry.

7. The method according to claim 1, wherein at least one of the optical elements has a spherical optical function in standard wearing conditions.

8. The method according to claim 1, further comprising, prior to the processing:

providing prescription data used to correct the abnormal refraction of the eye of the person;

providing at least one abnormal refraction parameter relating to the abnormal refraction of an eye of the person;

providing at least one sensitivity parameter representing the variation of sensitivity of the person as a function of at least one parameter of the optical elements;

determining a value of the at least one parameter of the optical elements adapted for the person based on the abnormal refraction parameter and the sensitivity parameter; and determining surface data representing at least one surface of a lens element to be manufactured based at least on the prescription data and the value of the at least one parameter of the optical elements adapted for the person.

9. The method according to claim 1, wherein the processing of the at least one unfinished face and at least a part of the plurality of the optical elements are realized in one pass.

10. The method according to claim 1, wherein the processing of the at least one unfinished face and at least a part of the plurality of the optical elements are realized successively by processing the at least one unfinished face then by processing the at least a part of the plurality of the optical elements.

11. The method according to claim 10, wherein the processing of the at least one unfinished face and at least a part of the plurality of the optical elements are realized in the same frame of reference without unblocking the lens blank.

12. The method according to claim 1, wherein the provided lens blank comprises a layer of PMMA disposed on the at least one unfinished surface.

13. The method according to claim 1, wherein, after processing, the method comprises polishing the machined surface comprising at least part of the plurality of the optical elements, wherein one or more of a polishing tool, a polishing speed, and a polishing time is adapted to reduce material removal while maintaining a high level of transparency.

14. The method of claim 11, wherein the processing of the at least one unfinished face and at least a part of the plurality of the optical elements are realized by using different tools.

15. The method according to claim 2, wherein the at least part of the plurality of optical elements are contiguous.

16. The method according to claim 2, wherein the at least one unfinished face is the front or back face of the lens blank.

17. The method according to claim 3, wherein the at least one unfinished face is the front or back face of the lens blank.

18. The method according to claim 2, wherein at least one of the optical elements has an optical function of focusing an image on a position other than the retina in standard wearing conditions or of not focusing an image in standard wearing conditions.

19. A lens element configured to be worn in front of an eye of a person, the lens element comprising:

two opposite optical faces; and a plurality of optical elements having an optical function of not focusing an image on the retina of the eye of the person to slow down the progression of the abnormal refraction of the eye, wherein at least a part of the plurality of the optical elements are disposed on one of the optical face that in combination with the opposed optical face provides a refractive power based on a prescription for said eye of the person, wherein the optical function is light refraction, and wherein a part of the at least one unfinished face that provides the refractive power and at least the part of the plurality of the optical elements are realized in a same manufacturing operation.

20. The lens element according to claim 19, further comprising a layer of PMMA on at least one surface comprising at least part of the plurality of optical elements.

\*  \*  \*  \*  \*